United States Patent [19]
Gaspard

[11] Patent Number: 5,658,482
[45] Date of Patent: Aug. 19, 1997

[54] INDUCTION COOKER WITH REDUCED PARASITIC RADIATION

[75] Inventor: Jean-Yves Gaspard, Saran, France

[73] Assignee: CEPEM, St Jean de la Ruelle, France

[21] Appl. No.: 559,315

[22] Filed: Nov. 15, 1995

[30] Foreign Application Priority Data

Nov. 15, 1994 [FR] France .................. 94 13651

[51] Int. Cl.⁶ .................. H05B 6/12; H05B 6/06
[52] U.S. Cl. .................. 219/622; 219/620; 219/660; 219/671; 174/35 R
[58] Field of Search .................. 219/620, 622, 219/624, 625, 626, 627, 663, 665, 666, 667, 668, 671, 660; 174/35 R; 361/212

[56] References Cited

U.S. PATENT DOCUMENTS

| | | | |
|---|---|---|---|
| 3,898,410 | 8/1975 | Peters, Jr. | 219/663 |
| 3,996,442 | 12/1976 | Moreland, II et al. | |
| 4,163,139 | 7/1979 | Malarkey et al. | |
| 4,426,564 | 1/1984 | Steigerwald et al. | |
| 4,467,162 | 8/1984 | Kondo et al. | 219/624 |
| 5,278,381 | 1/1994 | Rilly | 219/624 |

FOREIGN PATENT DOCUMENTS

| | | |
|---|---|---|
| 2 200 722 | 4/1974 | France . |
| 2 649 576 | 1/1991 | France . |
| 52-14944 | 2/1977 | Japan .................. 219/624 |
| 4-209489 | 7/1992 | Japan .................. 219/624 |

OTHER PUBLICATIONS

Patent Abstracts of Japan, vol. 016 No. 554 (E-1293), Nov. 25, 1992, & JP-A-04 209489 (Sharp Corp) Jul. 30, 1992, abridged.

*Primary Examiner*—Philip H. Leung
*Attorney, Agent, or Firm*—Oblon, Spivak, McClelland, Maier & Neustadt, P.C.

[57] ABSTRACT

An induction cooker comprises at least one cooking heater comprising an inductor, a generator delivering a AC current to supply the inductor and an element made of a non-magnetic, electrically conductive material to provide shielding against the disturbances generated by the inductor. The shielding function is improved by electrically connecting the element to the mains by means of a high-frequency filter of the generator. Preferably, the electrical link between the shielding and the filter comprises a capacitor.

12 Claims, 1 Drawing Sheet

INDUCTION COOKER WITH REDUCED PARASITIC RADIATION

BACKGROUND OF THE INVENTION

1. Field of the Invention

The present invention is aimed at proposing an improvement in systems of shielding against the electromagnetic disturbances generated by an inductor used in induction cookers.

In an induction cooker, a cooking heater is conventionally formed by an inductor comprising one or more coils which may or may not be concentric, the inductor being powered by a generator that delivers AC current at a frequency of about 20 to 50 KHz. The inductor through which this current flows produces currents, by induction, in the walls and at the bottom of a container placed on top of this inductor. These currents heat the container and then the substance to be cooked in the container.

It is known that an inductor of this kind is liable to generate parasitic electromagnetic fields, also called disturbances, that are radiated towards the exterior of the cooker. Such a situation may occur, for example, when the container to be heated has a diameter smaller than the size of the inductor.

Apart from the unnecessary loss of electromagnetic fields produced by the inductor, these parasitic fields give rise to disturbances in the working of radioelectrical instruments in the vicinity of the cooker. They must therefore be reduced to the minimum.

Furthermore, by virtue of its construction, an inductor induces not only an electromagnetic field towards the container to be heated but also a rear magnetic field, namely a field beneath the inductor. This raises the risk of jeopardizing the efficient working of the electric components of the apparatus and of giving rise to disturbances by conduction hereinafter called conduction disturbances.

2. Description of the Prior Art

Many techniques have already been proposed to reduce radiated disturbances and/or conduction disturbances.

For example, there is a known way of reducing the outward parasitic electromagnetic field to the minimum by accompanying the coil of the inductor with a counter-turn, for example a counter-turn of a compensation coil, wound around the heating coil so that the current flowing through this coil is opposite in its direction to the current flowing through the heating coil. The results obtained by this method are however not optimal. Furthermore, this method is ill-suited to a case where the inductor is formed by several heating coils in a concentric arrangement. Indeed, if a single counter-turn is placed around the external coil, the parasitic electromagnetic fields created by the internal coils are not compensated for. However, if a counter-turn is placed between each heating coil, there is a risk that it might disturb the working of the cooker since it is covered by a container (giving rise to a drop in the reactance of the coil, heating by eddy currents in the counter-turns that are difficult to dissipate., cold zones on the walls of the container due to the local cancellation of the magnetic field, etc.).

Furthermore, it is also known that the rear parasitic radiation of the inductor can be avoided by using a ferrite-based magnetic circuit located beneath the inductor. A magnetic circuit such as this however has limitations during operation because it may, under certain conditions, lose its magnetic properties, especially if the temperature of the ferrites used reaches the Curie temperature corresponding to these ferrites.

Another known approach, described for example in the document FR 2 649 576, consists in surrounding the inductor with a shielding cage made of a non-magnetic material, the bottom of the cage being also closed by means of a plate made of non-magnetic material. This approach provides for a reduction in the radiated disturbances and conduction disturbances defined here above. However, it is better suited to professional cookers and can be hardly transposed to the field of large-scale consumer applications wherein it is necessary to design cookers that are as compact as possible.

Now, in the document FR 2 649 576, the bottom of the shielding cage must be at a minimum distance from the inductor and this minimum distance is too great for large-scale consumer applications.

Furthermore, the different plates used to form the shielding cage are the site of eddy currents and, in turn, generate conduction disturbances and/or radiated disturbances.

SUMMARY OF THE INVENTION

The present invention is aimed at proposing a shielding system for inductors that does not have the above drawbacks and limitations.

More specifically, a first object of the invention is an induction cooker of the type comprising at least one cooking heater comprising an inductor, a generator delivering a high-frequency AC current to supply the inductor and at least one element made of a non-magnetic, electrically conductive material to minimize the parasitic radiation of the inductor, wherein the generator has a high-frequency filter connected to the mains and wherein the element is electrically connected to the mains by means of said filter.

Furthermore, a second object of the invention is an induction cooker of the type comprising a plurality of cooking heaters, each comprising an inductor and an element made of non-magnetic, electrically conductive material wherein the cooker further comprises a single generator comprising a high-frequency filter connected to the mains and wherein each element is electrically connected to the mains by means of said filter.

Furthermore, a third object of the invention is an induction cooker of the type comprising a plurality of cookers each comprising an inductor and a magnetic circuit, wherein the cooker further comprises a single element made of non-magnetic, electrically conductive material for the shielding and the supporting of all the inductors and a single generator comprising a filter to which a said element is electrically connected.

BRIEF DESCRIPTION OF THE DRAWING

The invention shall be understood more clearly from the following description, made with reference to the appended figures of which.

Figure 1:
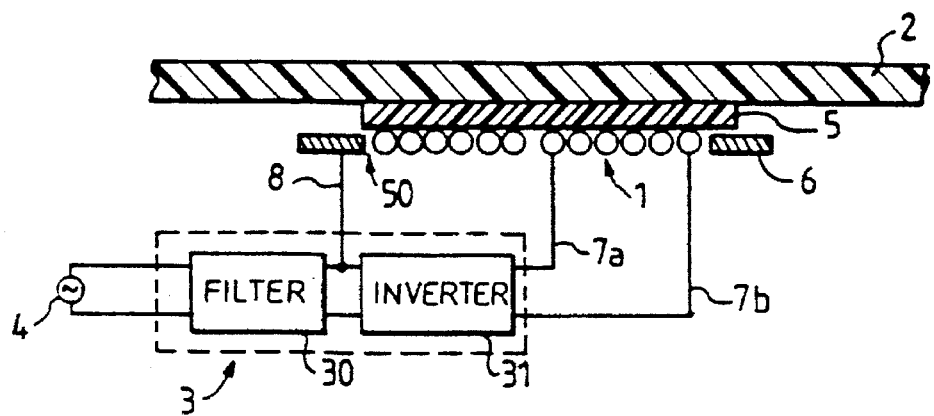
FIGS. 1 and 2 provide a schematic illustration of the connections between a generator and various elements constituting an induction cooker seen in a sectional view according to two possible variants according to the invention.

For clarity's sake, the elements common to all the figures bear the same references.

MORE DETAILED DESCRIPTION

All the figures give a schematic sectional view of a heater for an induction cooker comprising an inductor 1 placed beneath a cooking surface or cooking top 2, made for example of glass-ceramic, and a generator 3 connected to the general low-frequency mains symbolized by the reference 4. The lower surface of the cooking surface 2 and the inductor 1 are preferably separated by a layer 5 of heat-insulator material. The cooking heater to which the present invention applies also has an element 6 made of a non-magnetic, electrically conductive material, for example aluminium, used to shield the inductor. This element 6 may, for example, be a plate or a screen.

The types of shielding made of aluminium-type non-magnetic, electrically conductive material used up till now are crossed by stray phenomena that are not eliminated because the shielding elements are either floating elements or connected to the ground. The result thereof is that the shielding elements are then themselves generators of disturbance.

To overcome this problem, the present invention proposes the electrical connection of the shielding to the mains. It is however necessary to take filtering precautions because the stray phenomena should not be re-injected into the supply mains.

Now, the generators used to supply the inductor with current are already fitted out with high-frequency filters enabling them to be connected to the mains without causing disturbance.

More specifically, as shown schematically in the different figures, a generator 3 for an inductor that is connected to the mains 4 has a filter 30 followed, for example, by a current inverter 31 designed to supply the inductor 1 with high-frequency current by means of two electrical connections schematically referenced 7a and 7b.

The invention consists in using this pre-existing filter 30 designed for stopping the transmission to the mains of the high-frequency currents in the inductor, for the removal of the parasitic phenomena generated in the shielding elements without disturbing the supply network. To do this, the invention proposes the electrical connection of the shielding element 6 to a filtered potential of the generator, for example at neutral or phase.

The electrical connection 8 between the shielding element 8 and the filtered potential of the generator may be direct as shown schematically in FIG. 1.

However, for reasons of user safety, especially in the event of a deterioration of the glass-ceramic cooking surface 2, the electrical link will preferably be set up by means of a capacitor 9 (see FIG. 2) that provides for the galvanic insulation of the shielding while at the same time enabling polarization.

Figure 2:
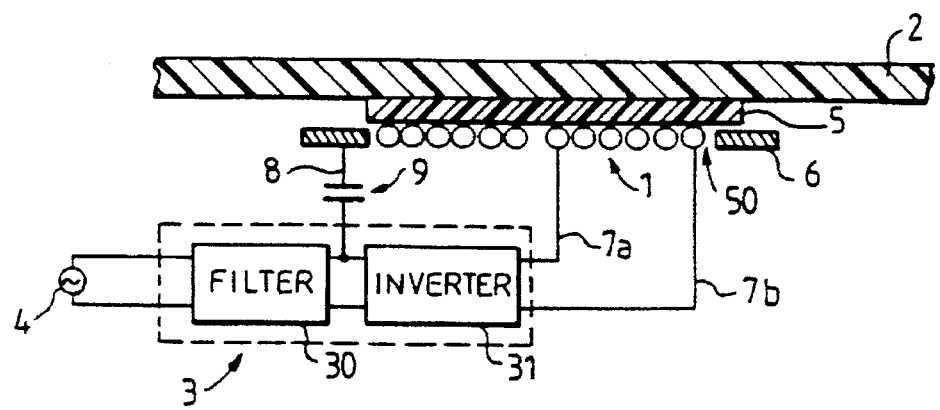

In the alternative embodiments of the invention represented in FIGS. 1 and 2, the element 6 is a plate located substantially in the plane of the inductor 1 and has an aperture 50 for the passage of the inductor. This variant enables the disturbance radiated outwards by the inductor 1 to be reduced to the minimum.

Figure 3:
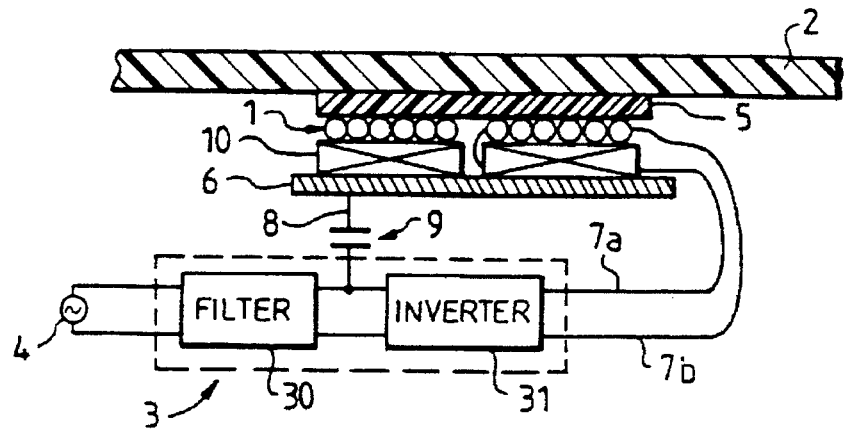
FIG. 3 provides a schematic illustration of a preferred alternative embodiment according to the invention.

In a preferred variant shown in FIG. 3, the induction cooking heater furthermore has a magnetic circuit 10 placed beneath the inductor. The plate 6 is then placed directly beneath this magnetic circuit where it simultaneously fulfils the role of a shielding against radiated disturbance and conduction disturbance from the inductor and the role of a support for the assembly formed by the inductor and the magnetic circuit. Advantageously, the electrical connection 7a between the center of the inductor 1 and the current inverter 31 is a wire going through the central aperture of the magnetic circuit 10 corresponding to the center of the inductor and then between the magnetic circuit 10 and the shielding 6. Similarly, the second electrical connection 7b circumvents the shielding 6.

There is thus obtained a highly compact induction cooking heater providing for the optimal minimizing firstly, through the shielding 6, of the disturbances conducted and radiated by the inductor by means of the shielding 6 and, secondly, through the electrical link 8, of the disturbances generated by the shielding itself. Measurements have shown that a cooker according to the invention can be used to obtain an appreciable gain with respect to conduction disturbances as compared with known cookers.

Other variants may be envisaged without departing from the context of the present invention. In particular, it is possible to make a cooker with several induction heaters supplied by a single generator. Each heater will have a shielding positioned either, according to the configuration of FIGS. 1 and 2, around the inductor or, according to the configuration of FIG. 3, beneath the inductor/magnetic circuit assembly. Each shielding element for each heater may be connected, according to the invention, to the mains by means of the filter of the generator. Advantageously, all the shielding elements may be connected to said filter by means of a single capacitor.

This shielding indeed has a capacitive effect with the coil of the inductor and with the charge. The fact of connecting it to a fixed potential limits this capacitive effect.

It is also possible to envisage a cooker with several heaters each having an inductor and a magnetic circuit, with a single shielding plate, connected to the mains by the filter used as a support for all the inductor/magnetic circuit assemblies.

What is claimed is:

1. An induction cooker of the type comprising at least one cooking heater comprising an inductor, a generator delivering a high-frequency AC current to supply the inductor and at least one element made of a non-magnetic, electrically conductive material to minimize the parasitic radiation of the inductor, wherein the generator has a high-frequency filter connected to the mains and wherein the element is electrically connected to the mains by means of said filter.

2. A cooker according to claim 1, wherein the element is connected to the filter of the generator by a direct electrical link.

3. A cooker according to claim 2, wherein the element is a plate located substantially in the plane of the inductor and comprises an aperture for the passage of the inductor.

4. A cooker according to claim 2, further comprising a magnetic circuit positioned beneath the inductor, and wherein said element is a plate that directly supports the element formed by the inductor and the magnetic circuit.

5. A cooker according to claim 1, wherein the element is electrically connected to the filter of the generator by means of a capacitor for a galvanic insulation enabling the polarization.

6. A cooker according to claim 5, wherein the element is a plate located substantially in the plane of the inductor and comprises an aperture for the passage of the inductor.

7. A cooker according to claim 5, further comprising a magnetic circuit positioned beneath the inductor, and wherein said element is a plate that directly supports the element formed by the inductor and the magnetic circuit.

8. A cooker according to claim 1, wherein the element is a plate located substantially in the plane of the inductor and comprises an aperture for the passage of the inductor.

9. A cooker according to claim 1, further comprising a magnetic circuit positioned beneath the inductor, and wherein said element is a plate that directly supports the element formed by the inductor and the magnetic circuit.

10. An induction cooker of the type comprising a plurality of cooking heaters, each comprising an inductor and an element made of non-magnetic, electrically conductive material wherein the cooker further comprises a single generator comprising a high-frequency filter connected to the mains and wherein each element is electrically connected to the mains by means of said filter.

11. A cooker according to claim 10, wherein each element is electrically connected to the filter by means of a capacitor.

12. An induction cooker of the type comprising a plurality of cookers each comprising an inductor and a magnetic circuit, wherein the cooker further comprises a single element made of non-magnetic, electrically conductive material for the shielding and the supporting of all the inductors and a single generator comprising a filter to which a said element is electrically connected.

* * * * *